(12) United States Patent
Cirucci et al.

(10) Patent No.: US 10,976,811 B2
(45) Date of Patent: Apr. 13, 2021

(54) EYE-TRACKING WITH MEMS SCANNING AND REFLECTED LIGHT

(71) Applicant: Microsoft Technology Licensing, LLC, Redmond, WA (US)

(72) Inventors: Nicholas Mark Cirucci, Redmond, WA (US); Joseph Daniel Lowney, Bothell, WA (US); Richard Andrew Wall, Kirkland, WA (US); Dmitry Reshidko, Redmond, WA (US); Ian Anh Nguyen, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 588 days.

(21) Appl. No.: 15/675,349

(22) Filed: Aug. 11, 2017

(65) Prior Publication Data
US 2019/0050051 A1    Feb. 14, 2019

(51) Int. Cl.
*G06F 3/01* (2006.01)
*G02B 26/08* (2006.01)
(Continued)

(52) U.S. Cl.
CPC ............. *G06F 3/013* (2013.01); *G02B 5/08* (2013.01); *G02B 26/0833* (2013.01);
(Continued)

(58) Field of Classification Search
CPC .... G02B 5/20; G02B 27/017; G02B 27/0093; G02B 2027/0187; G02B 2027/0178;
(Continued)

(56) References Cited

U.S. PATENT DOCUMENTS

| 5,949,583 A | 9/1999 | Rallison et al. |
| 7,253,960 B2 | 8/2007 | Yamazaki et al. |

(Continued)

FOREIGN PATENT DOCUMENTS

| WO | 2015012280 A1 | 1/2015 |
| WO | 2016191709 A1 | 12/2016 |

(Continued)

OTHER PUBLICATIONS

"International Search Report and Written Opinion Issued in PCT Application No. PCT/US2018/038643", dated Sep. 28, 2018, 14 pages.

*Primary Examiner* — Ryan A Lubit
(74) *Attorney, Agent, or Firm* — Alleman Hall Creasman & Tuttle LLP

(57) ABSTRACT

An eye-tracking system is provided. The system includes an at least partially transparent visible light waveguide having a visible light display region configured to emit visible light to impinge upon an eye of a user. A light source is configured to emit at least infrared (IR) light that travels along an IR light path to impinge on the eye. A microelectromechanical system (MEMS) scanning mirror positioned in the IR light path is configured to direct the IR light along the IR light path. A relay positioned in the IR light path downstream of the MEMS scanning mirror includes at least one mirror configured to reflect the IR light along the IR light path. At least one sensor is configured to receive the IR light after being reflected by the eye.

20 Claims, 12 Drawing Sheets

(51) Int. Cl.
  *G02B 27/01* (2006.01)
  *G02B 27/00* (2006.01)
  *G02B 5/08* (2006.01)
  *H04N 5/225* (2006.01)
  *H04N 5/33* (2006.01)
  *H04N 5/341* (2011.01)

(52) U.S. Cl.
  CPC ..... *G02B 27/0093* (2013.01); *G02B 27/0172* (2013.01); *H04N 5/2256* (2013.01); *H04N 5/33* (2013.01); *H04N 5/341* (2013.01); *G02B 2027/0125* (2013.01); *G02B 2027/0138* (2013.01); *G02B 2027/0187* (2013.01); *G05B 2219/35503* (2013.01)

(58) Field of Classification Search
  CPC ............ G02B 27/0172; G02B 27/0179; G02B 27/425; G02B 2027/0125; G02B 2027/0138; H04N 5/33; H04N 5/341; H04N 5/2256; G06F 3/013
  See application file for complete search history.

(56) References Cited

U.S. PATENT DOCUMENTS

| | | |
|---|---|---|
| 8,998,414 B2 | 4/2015 | Bohn |
| 9,116,337 B1 | 8/2015 | Miao |
| 2012/0105310 A1 | 5/2012 | Sverdrup et al. |
| 2013/0044130 A1* | 2/2013 | Geisner .................... G06F 3/002 345/633 |
| 2013/0077049 A1* | 3/2013 | Bohn .................... G02B 27/017 351/210 |
| 2013/0207887 A1* | 8/2013 | Raffle ..................... G06F 3/013 345/156 |
| 2014/0062868 A1* | 3/2014 | Blixt ..................... G01S 17/46 345/156 |
| 2014/0071400 A1 | 3/2014 | Gao |
| 2014/0184475 A1* | 7/2014 | Tantos .................. G02B 27/017 345/8 |
| 2015/0049004 A1 | 2/2015 | Deering et al. |
| 2015/0157198 A1 | 6/2015 | Sramek et al. |
| 2016/0209657 A1* | 7/2016 | Popovich ............ G06K 9/00604 |
| 2016/0242643 A1 | 8/2016 | Sprehn |
| 2016/0349514 A1* | 12/2016 | Alexander ............... G06F 3/013 |
| 2016/0364015 A1 | 12/2016 | Send et al. |
| 2017/0140223 A1* | 5/2017 | Wilson ............... G02B 27/0093 |
| 2017/0184847 A1* | 6/2017 | Petrov .................. H04N 5/2256 |
| 2018/0130391 A1* | 5/2018 | Bohn ................. G02B 27/0093 |
| 2018/0314416 A1* | 11/2018 | Powderly ............ G02B 27/0172 |

FOREIGN PATENT DOCUMENTS

| | | |
|---|---|---|
| WO | 2017053382 A1 | 3/2017 |
| WO | 2017060665 A1 | 4/2017 |

* cited by examiner

EYE-TRACKING WITH MEMS SCANNING AND REFLECTED LIGHT

BACKGROUND

In a wearable device such as a head-mounted display (HMD) device, tracking the positions of the eyes of a user can allow the HMD device to estimate the direction of a user's gaze. Gaze direction can be used as an input to a program that controls the display of images on the HMD. In order to determine the position and gaze of the user's eye, an eye-tracking system may be added to the HMD device. However, challenges exist in developing eye-tracking systems for HMD devices, since they can add weight, require extra processing power, create obstructions to the user's field of view, emit too much light near the user's eye, and cause other optical complications for the user.

SUMMARY

An eye-tracking system is provided. The system may include an at least partially transparent visible light waveguide having a visible light display region configured to emit visible light to impinge upon an eye of a user. The system may include a light source configured to emit at least infrared (IR) light that travels along an IR light path to impinge upon the eye of the user. A portion of the IR light path may traverse a portion of the visible light waveguide. The system may include a microelectromechanical system (MEMS) scanning mirror positioned in the IR light path; the MEMS scanning mirror may be configured to direct the IR light along the IR light path. The system may include a relay positioned in the IR light path downstream of the MEMS scanning mirror, and may include at least one mirror configured to reflect the IR light directed by the MEMS scanning mirror along the IR light path. The system may include at least one sensor configured to receive the IR light after being reflected by the eye.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventors have recognized that conventional eye-tracking systems may add extraneous bulk, weight, and design complications to the devices for which they are engineered. Stray light from the eye-tracking system light source may be problematic. Installing eye-tracking in display devices such as head-mounted display (HMD) devices may affect the costliness of the device, especially where optical relays requiring many components are involved. An acceptable ergonomic design that also optimizes a user's viewing experience is a significant goal. In response to these issues, the systems and methods described herein have been developed to provide a streamlined and efficient design for use in applications that utilize eye-tracking.

Figure 1:
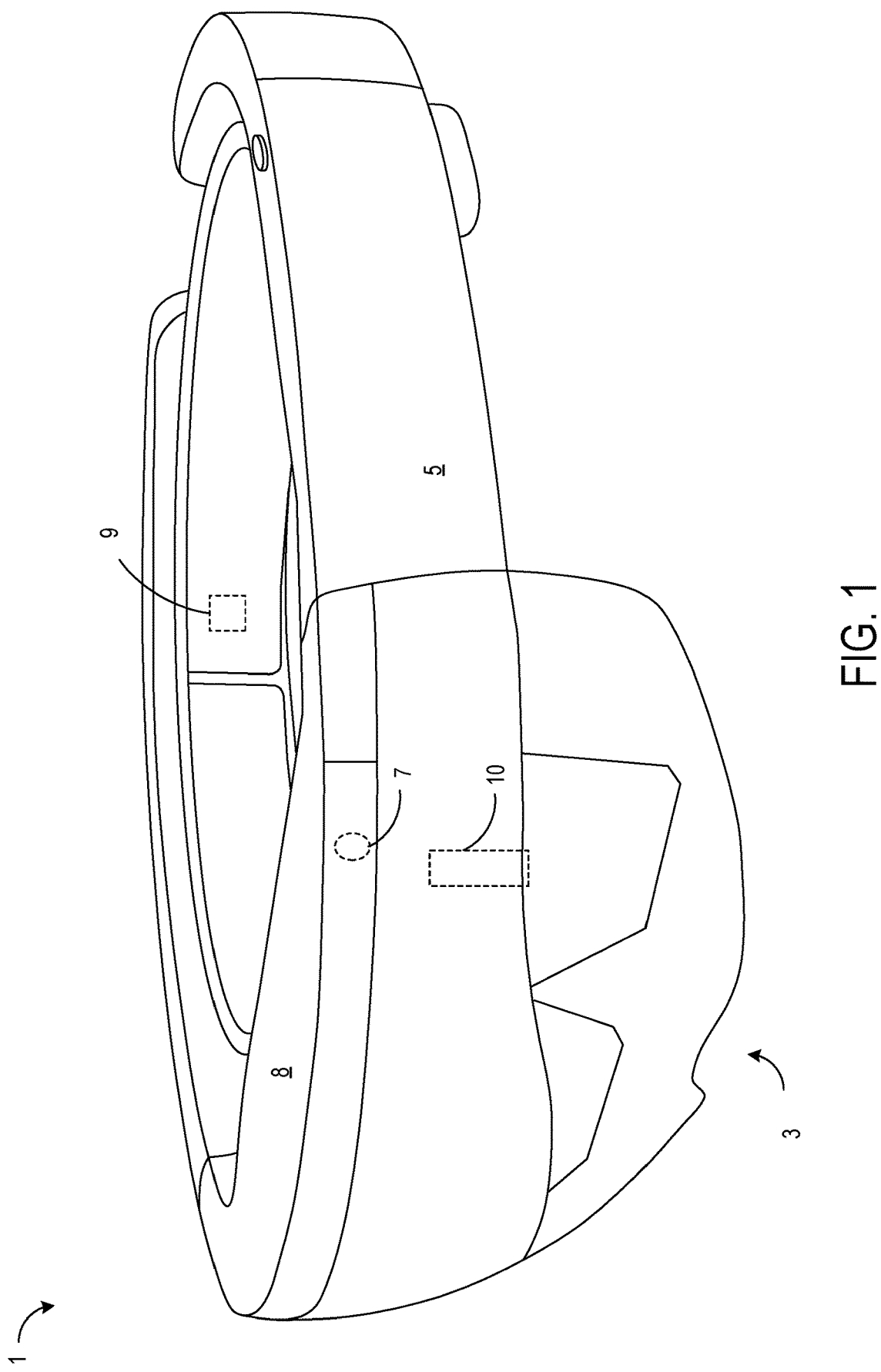
FIG. 1 shows a side perspective view of a head mounted display (HMD) device with an eye-tracking system.

FIG. 1 shows a side perspective view of an HMD device 1 with an eye-tracking system. In the example of FIG. 1, the HMD device 1 includes a display device 3 and a frame 5 that wraps around the head of a user to position the display device 3 close to the user's eyes when providing a virtual reality or mixed reality experience to the user. Any suitable display technology and configuration may be used to display images via the display device 3. For a virtual reality experience, the display device 3 may be a non-see-through Light-Emitting Diode (LED) display, a Liquid Crystal Display (LCD), or any other suitable type of opaque display. In some cases, outwardly facing cameras 7 may be provided that capture images of the surrounding environment, and these captured images may be displayed on the display along with computer generated images that augment the captured images of the real environment. For a mixed or augmented reality experience, the display device 3 may be at least partially transparent so that the user of the HMD device 1 may view a physical, real-world object in the physical environment through one or more partially transparent pixels displaying virtual object representations. For example, the display device 3 may include image-producing elements such as, for example, a see-through Organic Light-Emitting Diode (OLED) display.

The frame 5 may further support additional components of the HMD device 1, including a processor 8, an inertial measurement unit (IMU) 9, and an eye-tracking system 10. The processor 8 may include logic and associated computer memory configured to receive sensory signals from the IMU 9 and other sensors, to provide display signals to the display device 3, to derive information from collected data, and to enact various control processes described herein.

Figure 2A:
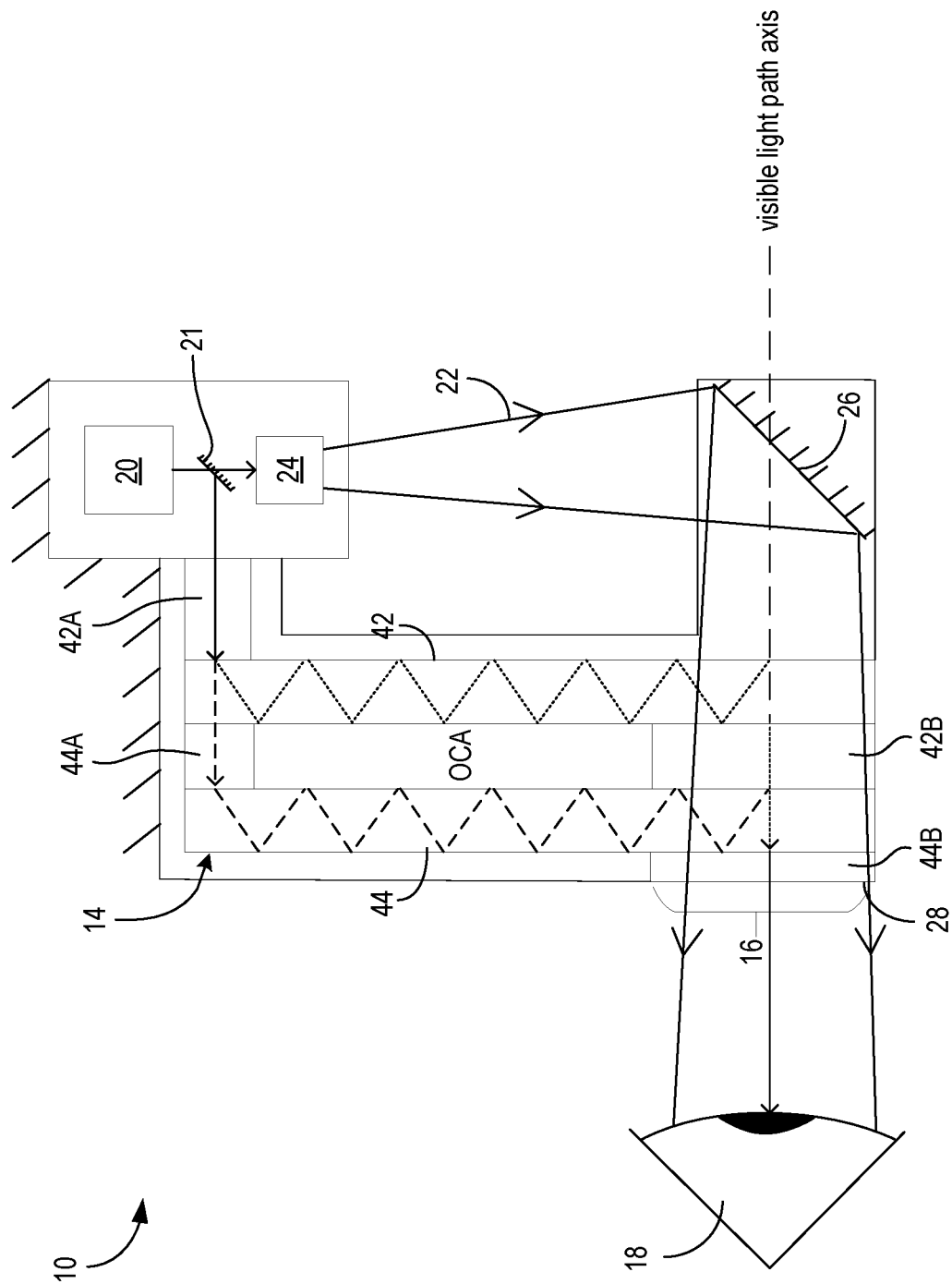
FIG. 2A is a side-view of a simplified illustration of a first implementation of the eye-tracking system of FIG. 1, including a hot mirror, where the IR light path traverses the waveguide.

FIG. 2A presents one implementation of an eye-tracking system 10. As discussed above, the eye-tracking system 10 may be included in an HMD device. The eye-tracking system 10 may include an at least partially transparent visible light (VL) waveguide 14 having a visible light display region 16 configured to emit visible light to impinge upon an eye 18 of a user. The visible light waveguide 14 may include a first VL waveguide 42 and a second VL waveguide 44. In one implementation, the first VL waveguide 42 may be configured to guide red and green light, while the second VL waveguide 44 may be configured to guide green and blue light. Each wavelength of light couples to the waveguide configured to direct the respective wavelength to the VL display region 16. At VL display region 16, light from the VL waveguide 14 may be emitted to the eye 18 of the user to create an augmented or fully virtual reality display to the user. The system 10 may include a light source 20 positioned on an opposite side of the display region 16 from the eye 18 of the user, the light source 20 being configured to emit at least infrared (IR) light that travels along an IR light path 22 to impinge upon the eye 18 of the user. In an alternative configuration, the light source 20 may be positioned on a same side of the display region 16 as the eye of the user. The light source 20 may be a laser module that includes a plurality of individual lasers, such as an IR laser, a red laser, a blue laser, and a green laser, each respectively being configured to emit a respective frequency of light. In the implementation of FIG. 2A, the emissions points for the IR and visible light are similarly situated (within light source 20 pointing downward); however, it will be appreciated that the IR light and visible light may or may not have similar emission points from their respective sources. FIG. 2A additionally indicates by outline a mounting structure for the system 10, which may be an at least partially transparent plastic or other appropriate material configured to mount the components of system 10 to each other, and to the HMD device 1. For simplicity, a mounting structure is not included in all figures. A mounting structure may be used to integrate the eye-tracking system 10, for example, within an HMD device 1 or other augmented reality lens system.

As depicted in FIG. 2A, the lasers that serve as the visible light and IR light emission sources may be packaged together and oriented in light source 20 to emit light at least initially along a coincident light path. In this implementation, the initial coincident light path proceeds only a short distance until a specially configured mirror 21 is used to reflect only visible light into the waveguide 14, and to allow infrared light to pass through. The visible light enters waveguide 14 through an entrance grating 42A, which is configured to in-couple red light and a portion of green light from the red laser and green laser of the light source 20, and to pass blue light and a portion of green light from the blue laser and green laser. Red light and a portion of green light proceeds to follow waveguide 42, until it contacts exit grating 42B, upon which point it is emitted along the visible light path axis toward the eye 18. Blue light and a portion of green light are passed through the entrance grating 42A without entering waveguide 42, to then encounter entrance grating 44A of waveguide 44 that is configured to in-couple the blue light and the portion of green light into the waveguide 44. The portion of green light and blue light pass along waveguide 44 until encountering exit grating 44B, at which point the light is emitted through display region 16 along the visible light axis toward the eye 18. It will be appreciated that the waveguides and gratings may be connected via optically clear adhesive (OCA) or by using other optically permissive adhesives and/or structures.

The IR light path will now be described. The system includes a microelectromechanical system (MEMS) scanning mirror 24 positioned in the IR light path 22. The MEMS scanning mirror 24 may be configured to direct the IR light along the IR light path 22. Following emission from the light source 20 and separation from the visible light path by the specially configured mirror 21, the IR light that passes through the specially configured mirror 21 proceeds to MEMS scanning mirror 24. A portion of the IR light path 22 may traverse a portion of the visible light waveguide 14 as shown in FIG. 2A, towards the bottom of the visible light waveguide 14 where the IR light path 22 crosses it from right to left in the Figure. To enable the IR light to traverse the visible light waveguide 14 in this implementation, the system 10 may include a relay positioned in the IR light path 22 downstream of the MEMS scanning mirror 24, which may include at least one mirror 26 configured to reflect the IR light directed by the MEMS scanning mirror 24 along the IR light path 22. In an alternative configuration, the laser module 20, and at least one mirror 26 if included, may be positioned such that the IR light path does not traverse the visible light waveguide 14. One example of such a configuration may be where the light source is positioned on a same side of the display region as the eye of the user; alternatively, the light source may be positioned on an opposite side of the display region from the eye of the user and at least one mirror used to direct the IR light around the visible light waveguide 14. This latter example is discussed further below.

It will be appreciated that light incident upon the eye is reflected from the eye by way of reflective biological structures within the eye. As the eye moves, the nature of the reflected light changes predictably. If the axis of the light passing into the eye is known, as it is in the implementations described herein, the orientation of the light reflected out of the eye can be calculated. Conversely, if the nature of the light incident upon the eye is known and the reflected light is measured, the location and orientation of the eye can be inferred algorithmically. Using these relationships, the system 10 reflects IR light in a predetermined pattern that is created using the MEMS mirror 24 and senses the position of reflected light to determine the eye position, and hence gaze direction. In addition, an eye-tracking system may allow capturing an image of the user's iris by recording the diffuse scattered light from the eye. Image analysis of the iris enables a user authentication feature.

Figure 9:
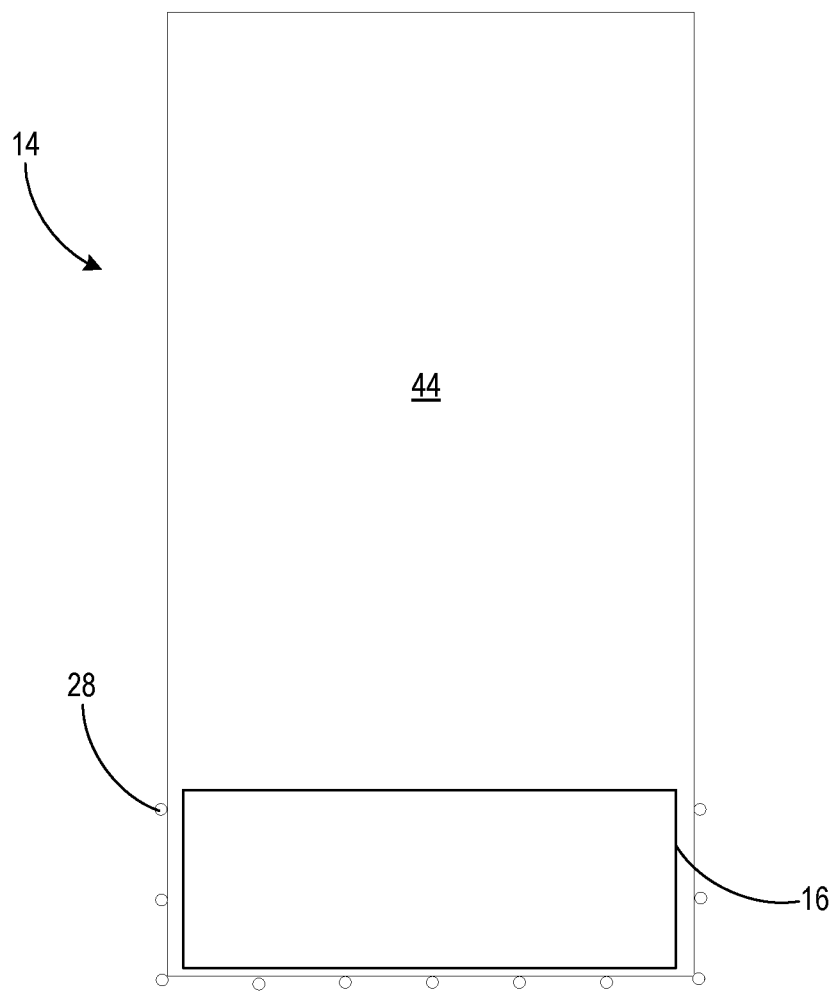
FIG. 9 is a front-view of one implementation of the sensors 28 positioned around the display region 16.

To provide this sensing functionality, the system 10 may include at least one sensor 28 configured to receive the IR light after being reflected by the eye 18. As shown in FIG. 9, the sensor may be positioned at one or more locations around the display region 16. Typically, the sensor is comprised of a plurality of light sensing devices that each may contain one or more spatially separated detectors (pixels).

The mirror 26 of eye-tracking system 10 may be a hot mirror that reflects IR light and transmits visible light, as shown in FIG. 2A. In one implementation, the mirror 26 may be positioned on a same side of the visible light waveguide 14 as the light source 20 and configured to reflect the IR light directed by the MEMS scanning mirror 24. In this manner, the IR light from the light source 20 is relayed to impinge on the eye 18. FIG. 2A also shows a visible light path axis connecting the eye 18 of the user and the display region 16. In this configuration, the IR light enters the eye 18 on-axis relative to the axis of the visible light emitted from the visible light waveguide 14 as it impinges on the eye 18. As used herein, the IR light path enters on-axis relative to the visible light emitted from display region 16 of the waveguide when the central axis of the IR light path is within plus or minus 20 degrees of the display region axis, which is perpendicular to an emissive surface of the display region 16, with a preferred range of plus or minus 5 degrees.

One potential advantage of the configuration of FIG. 2A is that the MEMS system used to create the display for the user may also provide eye-tracking with only a few additional components including an IR source. An additional advantage is that IR light may be directed toward the eye 18 on-axis with the visible light, thus providing an abundant amount of light to the eye 18 that facilitates reflecting and receiving light for optimal eye-tracking.

It will be appreciated that although IR light may enter the eye 18 on-axis relative to the axis of the visible light emitted from the display region 16, it is undesirable to have visible light included in the IR light path 22. Alternatively stated, although the visible light path and IR light path 22 may be coincident at least in part, before reaching the eye 18 residual visible light should be removed from the IR light path 22 in order to prevent the user from experiencing glare in the viewing of the display. In some implementations, filters may be used to remove residual visible light from the IR light path 22. Other techniques may be implemented as necessitated by the design of the system 10.

Figure 2B:
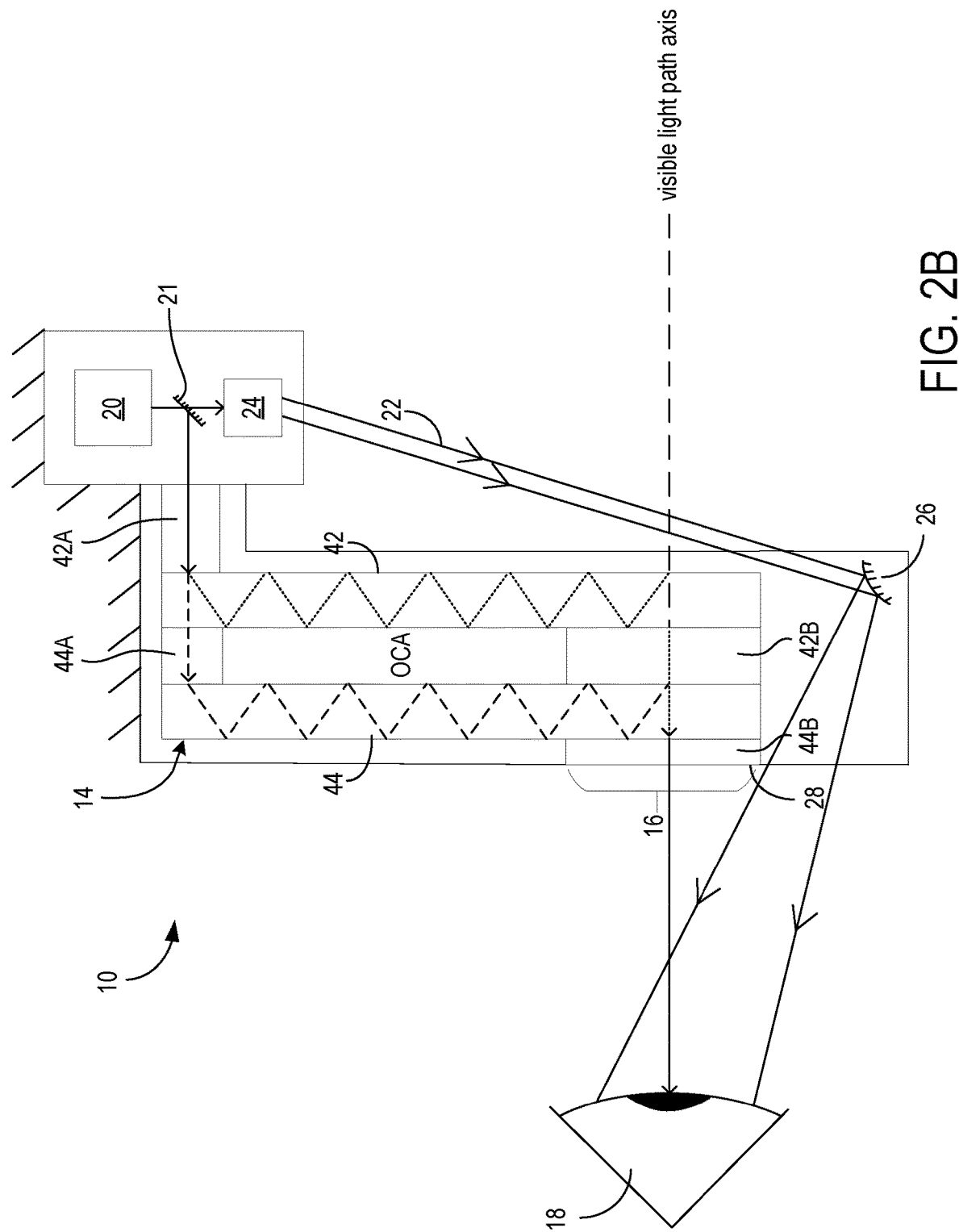
FIG. 2B is a side-view of an alternative implementation of the first implementation shown in FIG. 2A, where the IR light path does not traverse the waveguide.

FIG. 2B illustrates an alternative implementation in which the IR light path 22 does not traverse the visible light waveguide 14. In this implementation, the IR light directed by the MEMS scanning mirror 24 impinges on the mirror 26 that is positioned to reflect the IR light to the eye 18. Depicted here as a curved hot mirror, mirror 26 reflects the IR light path 22 as it corners around the visible light waveguide 14. Subsequently, IR light traveling the IR light path 22 as shown enters the eye 18 off-axis relative to the axis of the visible light emitted from the visible light waveguide 14 as it impinges on the eye 18. One potential advantage of this implementation is a reduction of any loss of IR light that may occur when the IR light passes through the visible light waveguide 14.

Figure 3:
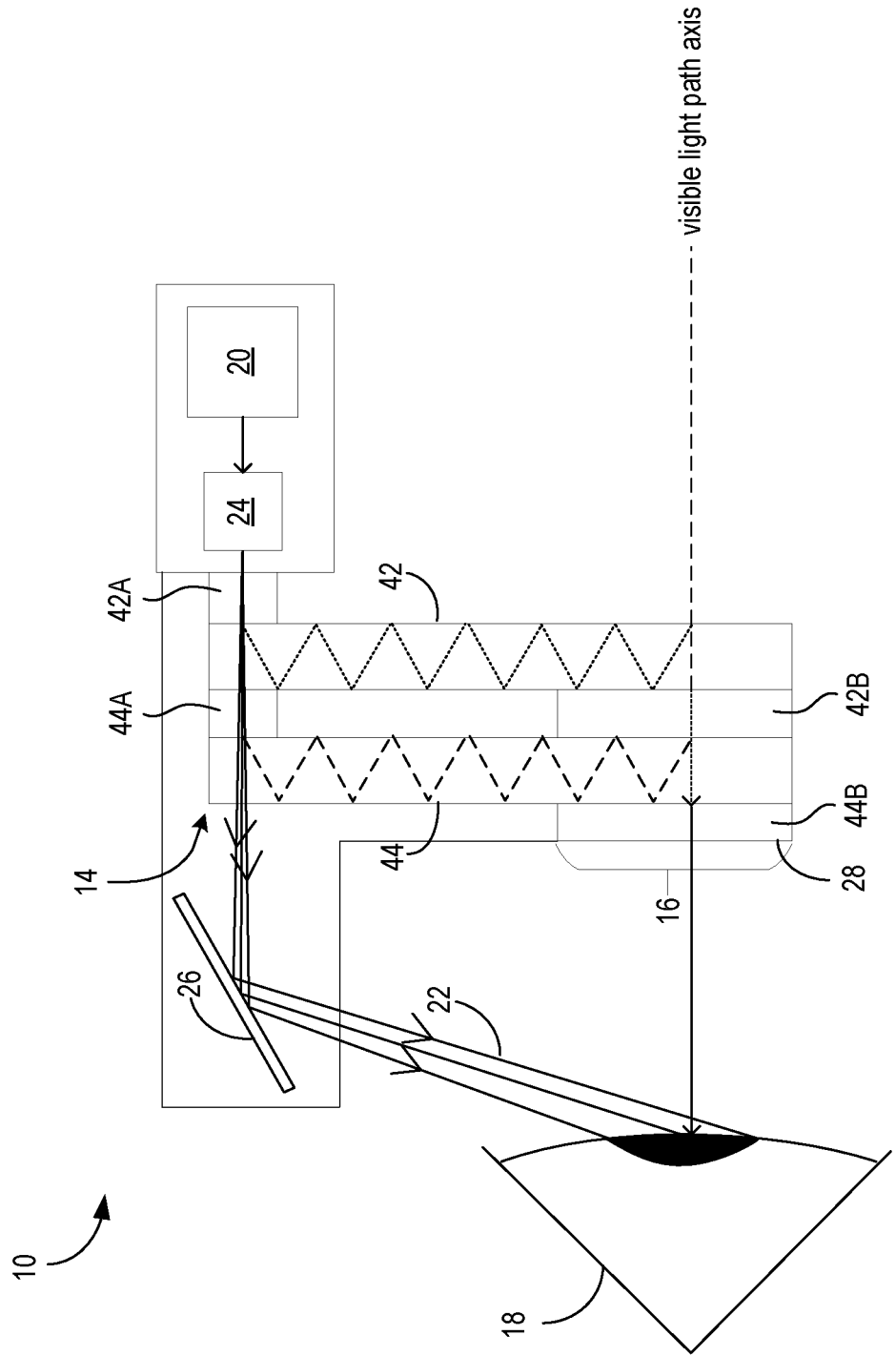
FIG. 3 is a side-view of a second implementation of the eye-tracking system of FIG. 1, including a fold mirror.

In an alternative implementation of eye-tracking system 10, the mirror 26 may be a fold mirror as shown in FIG. 3. The fold mirror may be positioned on the same side of the visible light waveguide 14 as the eye 18 and configured to reflect the IR light traversing a portion of the visible light waveguide 14. In this implementation, the fold mirror relays the IR light from the light source 20 to impinge on the eye 18. However, in this configuration the IR light enters the eye 18 off-axis relative to the axis of the visible light emitted from the visible light waveguide 14 as it impinges on the eye 18. One potential advantage of this configuration is that the fold mirror is not in the viewing path of the user and therefore may not disrupt the viewing experience of the user.

Figure 4:
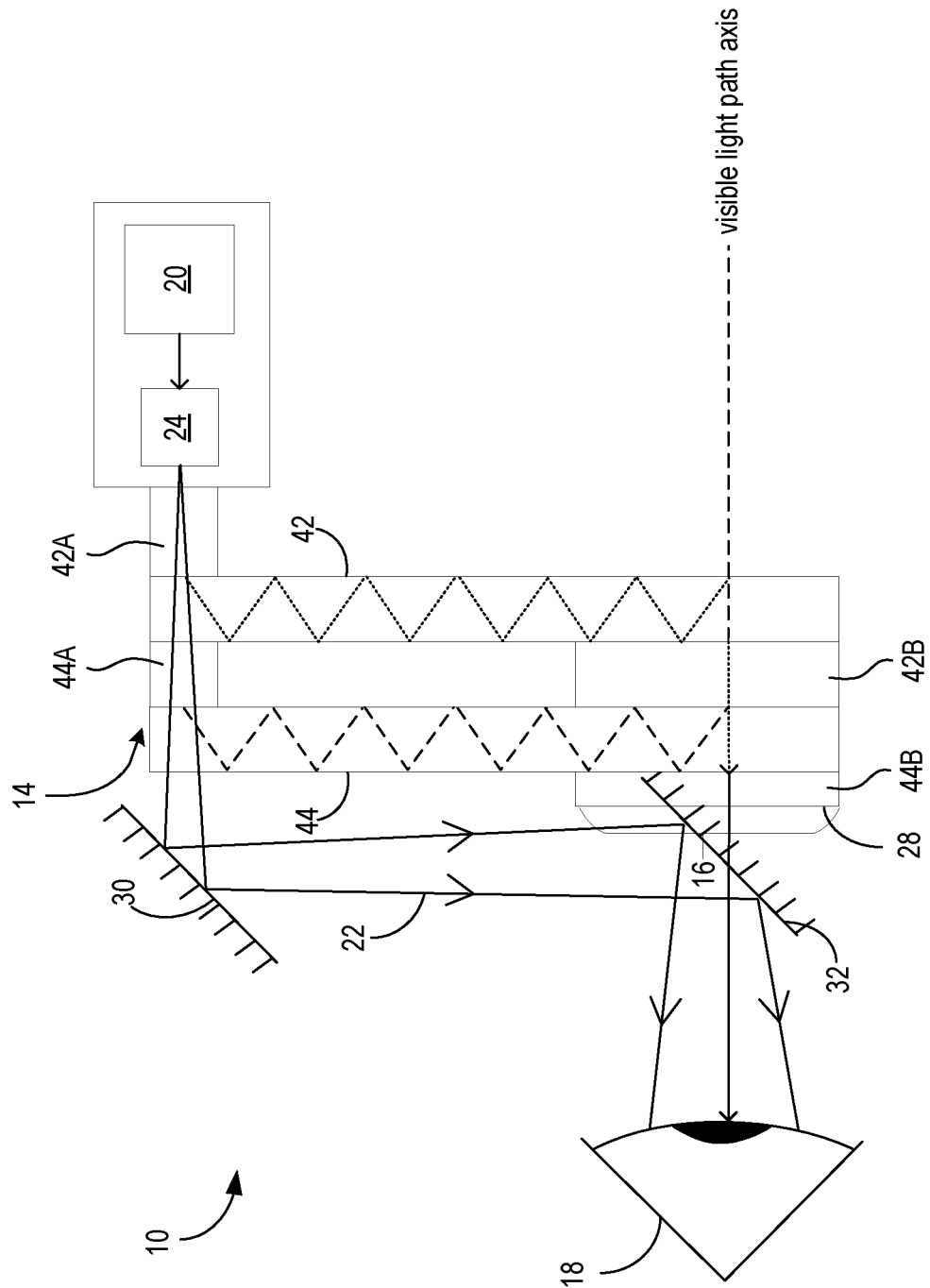
FIG. 4 is a side-view of a third implementation of the eye-tracking system of FIG. 1, including two hot mirrors.

FIG. 4 displays an implementation of the system 10 with a plurality of mirrors 26 that are, in this configuration, two hot mirrors that both reflect IR light and transmit visible light. The first hot mirror 30 and the second hot mirror 32 are positioned on a same side of the visible light waveguide 14 and configured to relay the IR light from the light source 20 along the IR light path 22. The first hot mirror 30 is configured to reflect the IR light downward as shown in FIG. 4 and the second hot mirror 32 is configured to reflect the IR light from the first hot mirror 30. After reflection from the second hot mirror 32, the IR light impinges on the eye 18 on-axis relative to the axis of the visible light emitted from the visible light waveguide 14 as it impinges on the eye 18. In the depicted embodiment, the IR light from light source 20 is emitted on a first horizontal, traverses the visible light waveguide, and is reflected downward at a substantially 90 degree angle by the first hot mirror 30 which is positioned at a 45 degree angle from the axis of emission of the IR light, and then travels down to the second mirror to be reflected at another substantially 90 degree angle toward the eye. The first and second hot mirrors are substantially parallel to each other and positioned adjacent opposite vertical ends of the visible light waveguide 14. Alternatively, it will be appreciated that the plurality of mirrors 26 may be positioned at other locations and orientations on the same side of the waveguide 14 as the user's eye in order to guide the light toward the user's eye.

Figure 5:
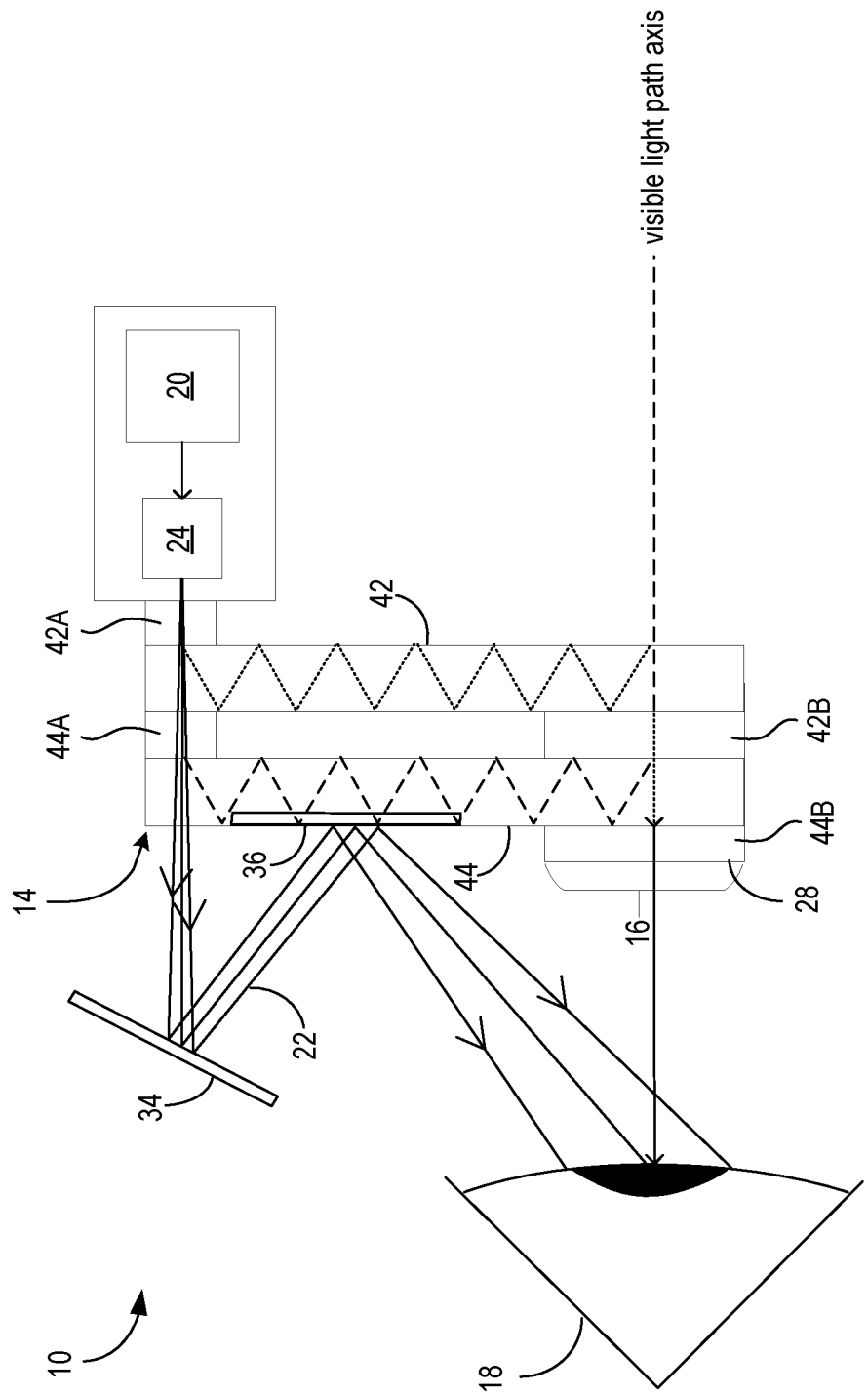
FIG. 5 is a side-view of a fourth implementation of the eye-tracking system of FIG. 1, including two fold mirrors.

Alternatively, the plurality of mirrors 26 may include a first fold mirror 34 and a second fold mirror 36, as shown in FIG. 5. The first fold mirror 34 and the second fold mirror 36 may be positioned on the same side of the visible light waveguide 14 as the eye 18 and configured to relay the IR light from the light source 20 along the IR light path 22. The first fold mirror 34 may be configured to reflect the IR light traversing a portion of the visible light waveguide 14 and the second fold mirror 36 may be configured to reflect the IR light from the first fold mirror 34. In the configuration displayed in FIG. 5, the first fold mirror 34 is positioned at approximately a 60 degree angle relative to the emission axis of the IR light emitted from the light source, and the second fold mirror 36 is positioned perpendicular to the emission axis. The IR light is reflected once off each of the fold mirrors 34, 36 and impinges on the eye 18 off-axis relative to the axis of the visible light emitted from the visible light waveguide 14. One potential advantage to this configuration is the placement of both fold mirrors 34 and 36 outside of the field of view of the user. Also, by using the second fold mirror 36, although the IR light impinging on the eye 18 is still off-axis as it is in the configuration shown in FIG. 3, the angle of incidence of the IR light impinging on the eye 18 is smaller. Therefore, more of the IR light reflected by the eye 18 may be received in the region of the sensors 28. It will be appreciated that in one implementation, one possible angle of incidence is in a range of 15 to 25 degrees, and another possible angle of incidence range is in a range of 35 to 45 degrees, as measured from the eye's neutral position looking straight ahead.

Figure 6:
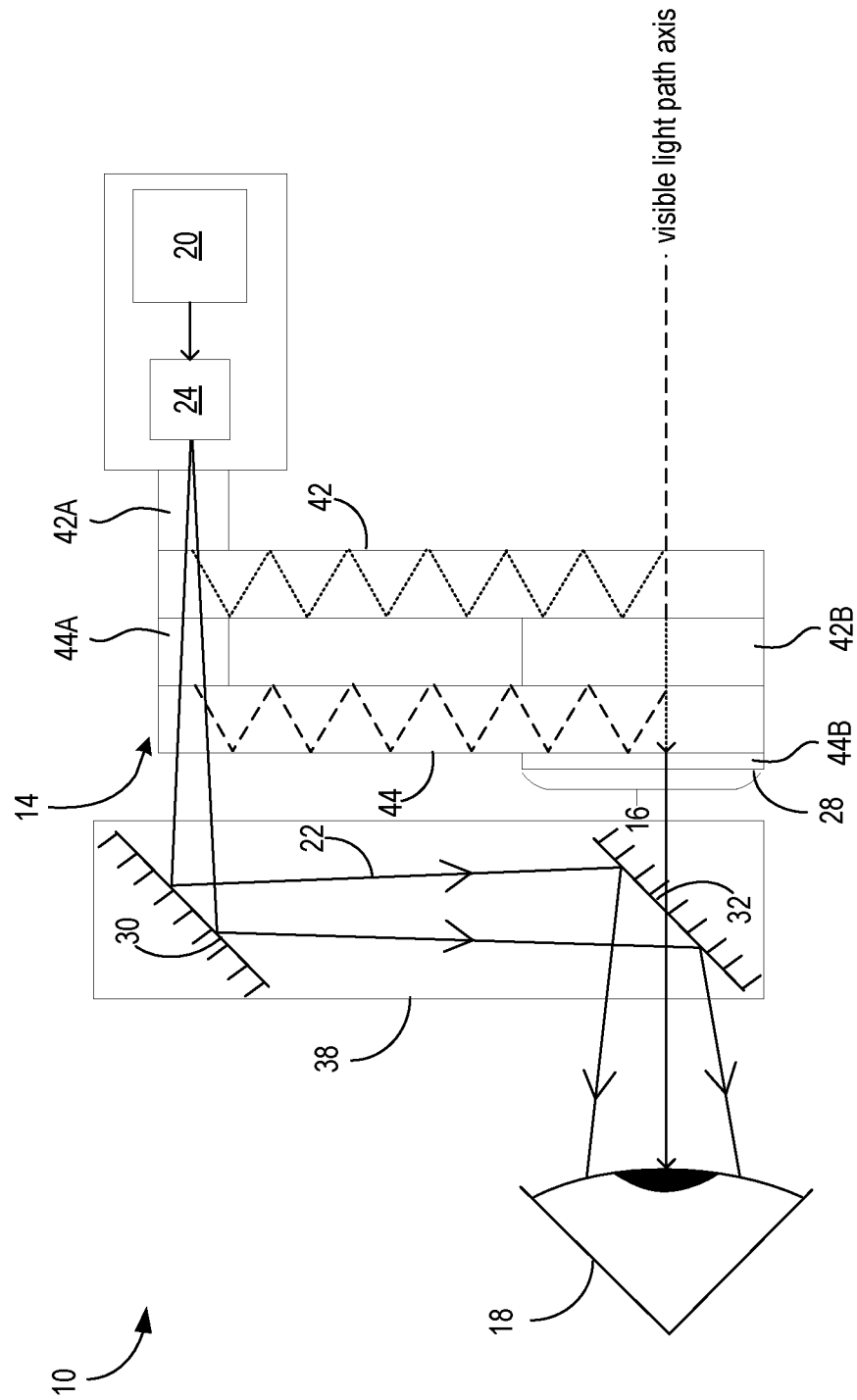
FIG. 6 is a side-view of a fifth implementation of the eye-tracking system of FIG. 1, including an IR waveguide.

In an additional implementation, the system 10 includes an IR waveguide 38 as shown in FIG. 6, which is similar to the configuration of FIG. 4 except for the encasement of the hot mirrors 30, 32 in an IR waveguide 38. As shown, the IR waveguide 38 may be positioned between the eye 18 and the visible light waveguide 14. In FIG. 6, the plurality of mirrors 26 includes the first hot mirror 30 and the second hot mirror 32 embedded in the IR waveguide 38. The hot mirrors 30 and 32 relay the IR light from the light source 20 along the IR light path 22 and within the IR waveguide 38. The first hot mirror 30 may be configured to reflect the IR light traversing a portion of the visible light waveguide 14 and the second hot mirror 32 may be configured to reflect the IR light from the first hot mirror 30 out of the IR waveguide 38 to impinge on the eye 18. In this configuration, the IR light impinges on the eye 18 on-axis relative to the axis of the visible light emitted from the visible light waveguide 14. One potential advantage for this configuration is that the first and second hot mirrors 30 and 32 may be easily mounted within the IR waveguide 38 without any additional structure. It will be appreciated that the IR waveguide 38 may be on a same side of the VL waveguide 14 as the MEMS.

Figure 7:
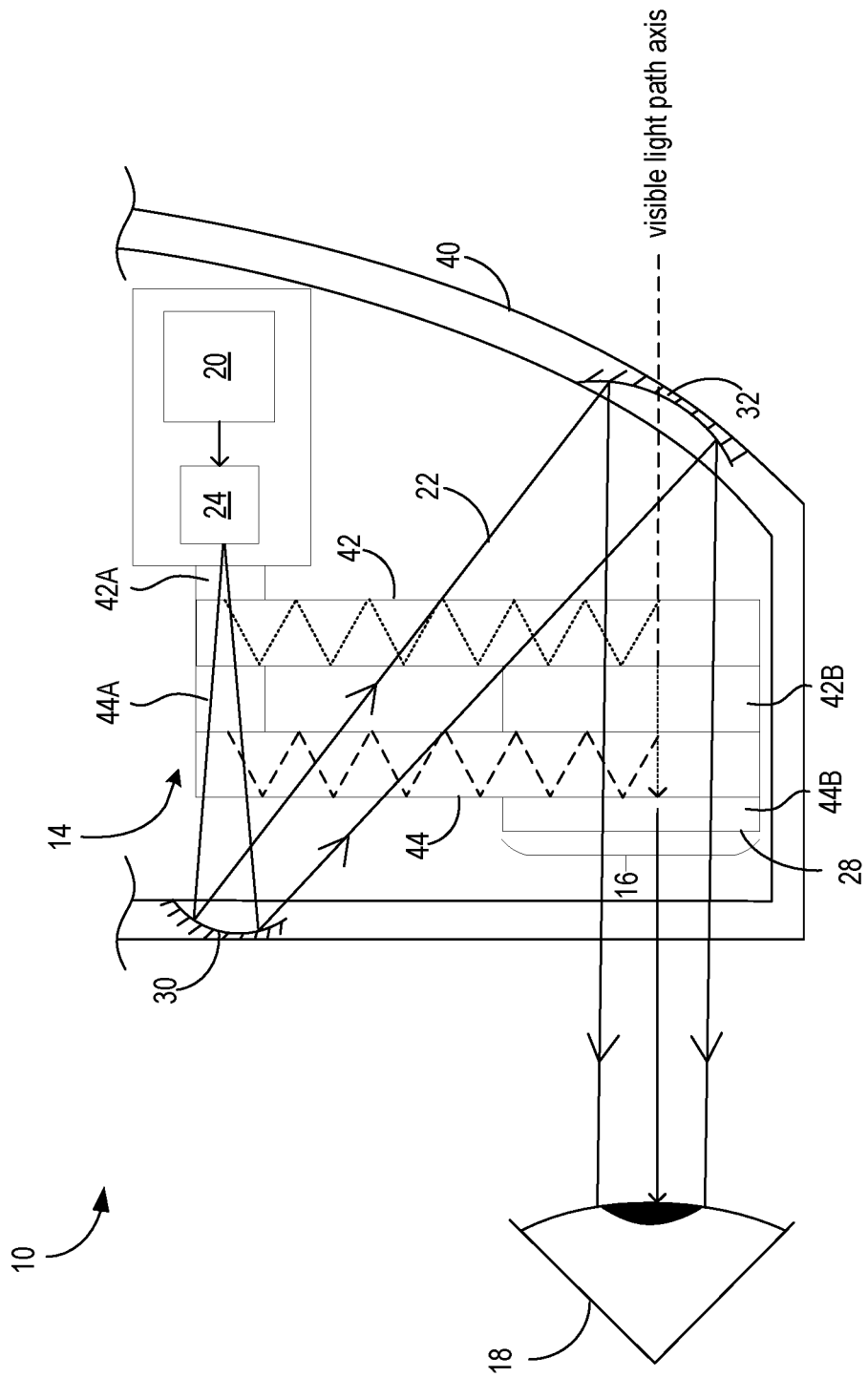
FIG. 7 is a side-view of a sixth implementation of the eye-tracking system of FIG. 1, including an HMD device visor and hot mirrors.

In an alternative implementation shown in FIG. 7, the visible light waveguide 14, light source 20, MEMS scanning mirror 24, mirrors 26, and sensor 28 are mounted in an HMD device 1 such as that shown in FIG. 1. The implementation shown in FIG. 7 additionally may include a visor 40. A plurality of portions of the IR light path 22 may traverse a corresponding plurality of portions of the visible light waveguide 14 as illustrated. The plurality of mirrors 26 may include a first hot mirror 30 and a second hot mirror 32, each of which reflects IR light and transmits visible light as described above. The first hot mirror 30 and the second hot mirror 32 may be embedded in the visor 40 as shown in FIG. 7 and configured to relay the IR light from the light source 20 along the IR light path 22. The first hot mirror 30 is shown embedded in the visor 40 at a location that is on-axis with the horizontal visible light path through the display region to the eye, and below the light source 20, and the first hot mirror 30 is embedded location that is aligned with the horizontal axis of light emitted from the light source 20. The first hot mirror 30 may be configured to reflect the IR light traversing at least a first portion of the plurality of portions of the visible light waveguide 14, as shown in the illustration of FIG. 7. The second hot mirror 32 may be configured to reflect the IR light from at least the first hot mirror 30 to traverse the visible light waveguide 14 in a second location that is on an opposite vertical end of the waveguide 14 from the first portion traversed by the IR light, to ultimately impinge on the eye 18. Thus, the IR light path 22 may traverse the visible light waveguide 14 multiple times before reaching the eye 18, as FIG. 7 displays. In this configuration, the IR light impinges on the eye 18 on-axis relative to the axis of the visible light emitted from the visible light waveguide 14. Further, both hot mirrors 30 and 32 are illustrated as curved hot mirrors and are designed to first diverge, and then substantially collimate the IR light by the time it enters eye 18.

A potential advantage of this configuration is that the first and second hot mirrors 30 and 32 may be mounted within the visor 40 without any additional structure, thus resulting in a lighter and more efficiently designed device 1. In one implementation, the mirrors 26 may be coatings applied to appropriate portions of the visor 40, further streamlining the design of the device 1. Alternatively, a combination of mirrors 26 and coated portions of the visor 40 may be implemented. It will be appreciated that the mirrors 26 may be curved or flat in any of the implementations. Additionally, the light may be partially or fully collimated.

Figure 8:
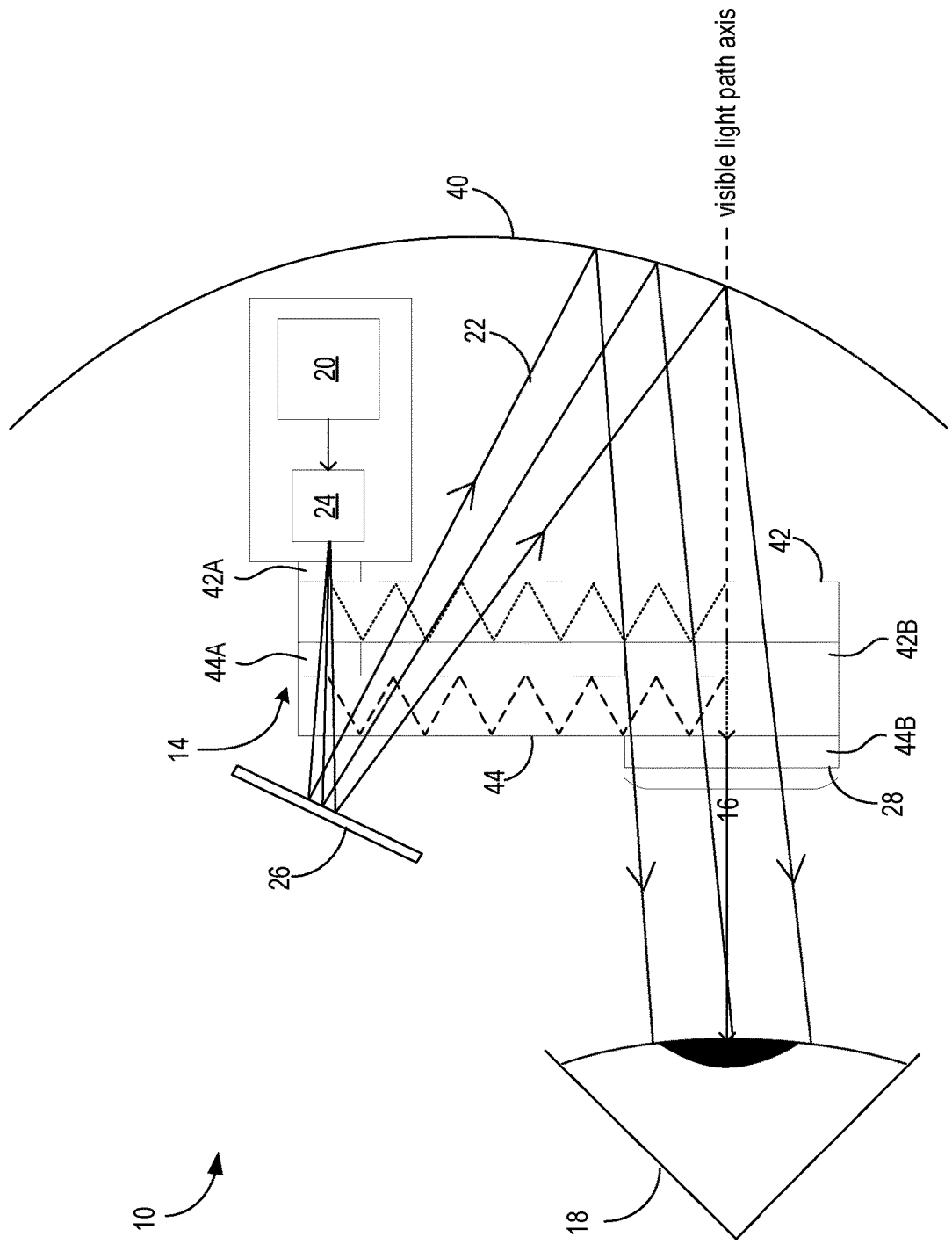
FIG. 8 is a side-view of a seventh implementation of the eye-tracking system of FIG. 1, including an HMD device visor and a fold mirror.

FIG. 8 shows an additional configuration of the system 10 within an HMD device 1. A plurality of portions of the IR light path 22 may traverse a corresponding plurality of portions of the visible light waveguide 14 as illustrated. In this configuration, the mirror 26 is a fold mirror positioned on the same side of the visible light waveguide 14 as the eye 18, vertically aligned with an emission axis of the light source 20. The angle of the fold mirror 26 is approximately 60 degrees in the illustrated embodiment, although other angles are possible. The fold mirror is configured to reflect the IR light traversing a first portion of the plurality of portions of the visible light waveguide 14. The IR light path 22 continues to a surface of the visor 40, which is configured to reflect the IR light from the mirror 26 and relay the IR light from the light source 20 to the eye 18. As shown in FIG. 8, the IR light impinges on the eye off-axis relative to the axis of the visible light emitted from the visible light waveguide 14.

Although depicted as the visor surface 40 in FIG. 8, the surface reflecting the IR light may be the surface of at least one component of the eye-tracking system 10. As long as the surface is configured to reflect the IR light from the mirror 26 to relay the IR light from the light source 20 to impinge on the eye 18, one or a plurality of surfaces within the system 10 may be used to reflect IR light along the IR light path 22. One potential advantage of this configuration is that, should the visor 40 be curved, as depicted, optical power is added to the reflective system. An additional potential advantage of this configuration is a simplification of the components necessary to compose the IR light path 22. As shown in FIG. 8, only a surface reflective to IR light in addition to a mirror 26 may be required to complete the IR light path 22. Alternatively, a backplate or other reflective surface may be substituted for the surface of the visor 40. Reflective surfaces may be mounted to any of the various components of the system 10 to complete the IR light path 22 as suggested by efficient designing.

Figure 10:
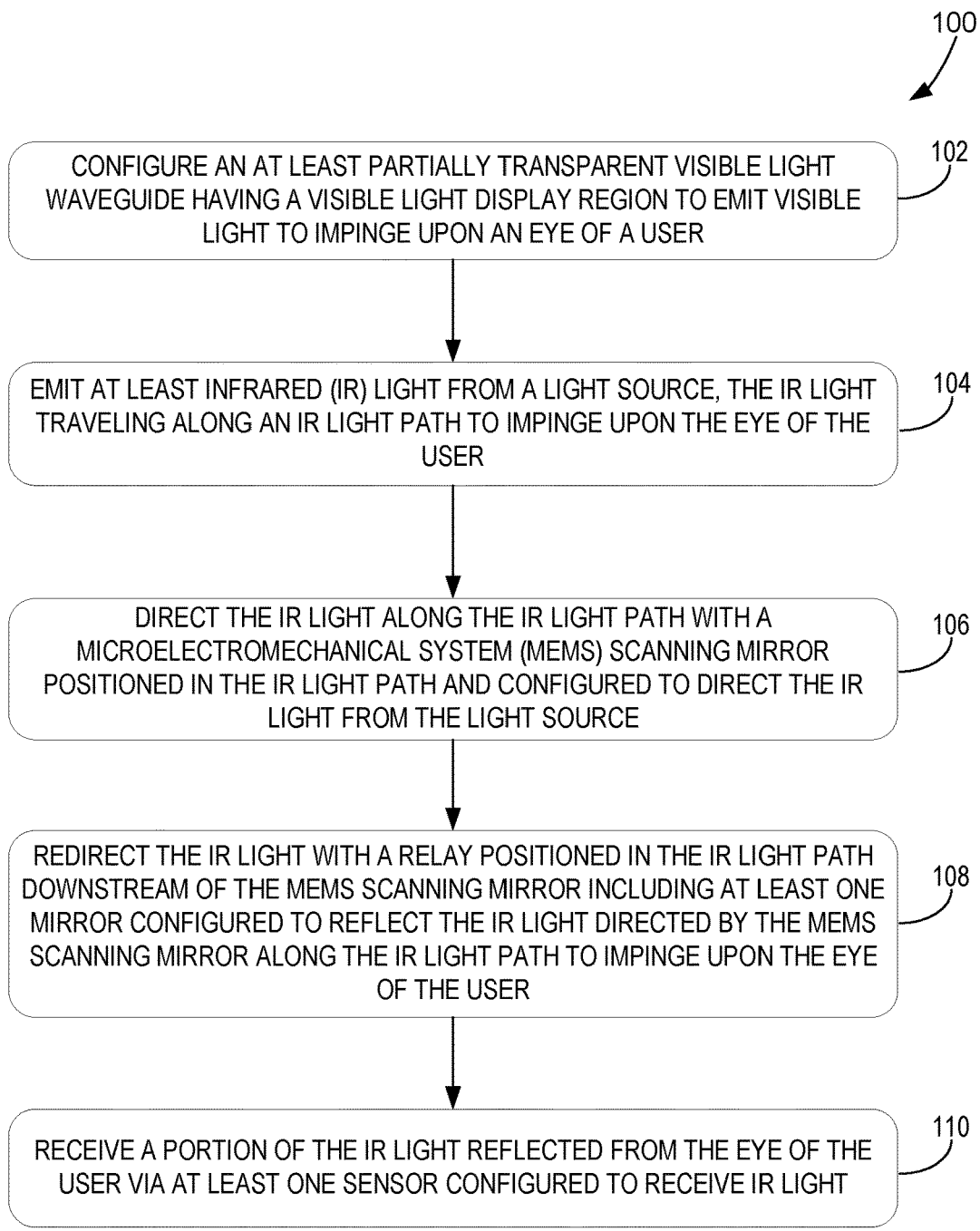
FIG. 10 is a flowchart of a method of illuminating an eye with the eye-tracking system of FIGS. 2A-2B.

FIG. 10 shows a flowchart of a method 100 of illuminating an eye with an eye-tracking system 10. The following description of method 100 is provided with reference to the eye-tracking systems described above and shown in FIGS. 2A-8. It will be appreciated that method 100 may also be performed in other contexts using other suitable components.

With reference to FIG. 10, at 102, the method 100 may include configuring an at least partially transparent visible light waveguide 14 having a visible light display region 16 to emit visible light to impinge upon an eye 18 of a user. The method at 104 may include emitting at least infrared (IR) light from a light source 20. The IR light may travel along an IR light path 22 to impinge upon the eye 18 of the user. In one configuration, the light source 20 may be positioned on an opposite side of the display region 16 from the eye 18 of the user, and a portion of the IR light path may traverse a portion of the visible light waveguide 14. In other configurations, the light source 20 may be positioned on a same side of the display region 16 as the eye of the user, such that the IR light path does not traverse the visible light waveguide 14. At 106, the method 100 may include directing the IR light along the IR light path 22 with a microelectromechanical system (MEMS) scanning mirror 24 positioned in the IR light path 22. The MEMS scanning mirror may be configured to direct the IR light from the light source 20.

At 108, the method 100 may include redirecting the IR light with a relay positioned in the IR light path 22 downstream of the MEMS scanning mirror 24. The relay may include at least one mirror 26 configured to reflect the IR light directed by the MEMS scanning mirror 24 along the IR light path 22 to impinge upon the eye 18 of the user. The method at 110 may include receiving a portion of the IR light reflected from the eye 18 of the user via at least one sensor 28 configured to receive IR light.

As described above, the mirror 26 may be a hot mirror that reflects IR light and transmits visible light. The hot mirror may be positioned on a same side of the visible light waveguide 14 as the light source 20 and be configured to reflect the IR light directed by the MEMS scanning mirror 24. The mirror 26 may be configured to relay the IR light from the light source 20 to impinge on the eye 18 on-axis relative to an axis of the visible light emitted from the visible light waveguide 14 as it impinges on the eye 18. Alternatively, the mirror 26 may be a fold mirror that may be positioned on a same side of the visible light waveguide 14 as the eye 18. The fold mirror may be configured to reflect the IR light traversing a portion of the visible light waveguide 14 and relay the IR light from the light source 20 to impinge on the eye 18. In this configuration, the IR light may impinge on the eye 18 off-axis relative to an axis of the visible light emitted from the visible light waveguide 14 as it impinges on the eye 18.

As further described above, the mirror 26 may be one of a plurality of mirrors. The plurality of mirrors may include a first hot mirror 30 and a second hot mirror 32 each of which reflects IR light and transmits visible light. The first hot mirror 30 and the second hot mirror 32 may be positioned on a same side of the visible light waveguide 14 and configured to relay the IR light from the light source 20 along the IR light path 22. The first hot mirror 30 may be configured to reflect the IR light traversing a portion of the visible light waveguide 14 and the second hot mirror 32 may be configured to reflect the IR light from the first hot mirror 30 to impinge on the eye 18. The IR light, in this configuration, may impinge on the eye 18 on-axis relative to an axis of the visible light emitted from the visible light waveguide 14 as it impinges on the eye 18. Alternatively, the plurality of mirrors may include a first fold mirror 34 and a second fold mirror 36. The first fold mirror 34 and the second fold mirror 36 may be positioned on a same side of the visible light waveguide 14 as the eye 18 and configured to relay the IR light from the light source 20 along the IR light path 22. The first fold mirror 34 may be configured to reflect the IR light traversing a portion of the visible light waveguide 14 and the second fold mirror 36 may be configured to reflect the IR light from the first fold mirror 34 to impinge on the eye 18. In this configuration, the IR light may impinge on the eye 18 off-axis relative to an axis of the visible light emitted from the visible light waveguide 14 as it impinges on the eye 18.

As also described above, an IR waveguide 38 may be positioned between the eye 18 and the visible light waveguide 14. A plurality of mirrors may include a first hot mirror 30 and a second hot mirror 32 each of which reflects IR light and transmits visible light. In this configuration, the first hot mirror 30 and the second hot mirror 32 may be embedded in the IR waveguide 14 and configured to relay the IR light from the light source 20 along the IR light path 22. The first hot mirror 30 may be configured to reflect the IR light traversing a portion of the visible light waveguide 14 and the second hot mirror 32 may be configured to reflect the IR light from the first hot mirror 30 to impinge on the eye 18 after exiting the IR waveguide 38. In this configuration, the IR light may impinge on the eye 18 on-axis relative to an axis of the visible light emitted from the visible light waveguide 14 as it impinges on the eye 18.

As also described above, the visible light waveguide 14, light source 20, MEMS scanning mirror 24, mirror 26, and sensor 28 may be mounted in an HMD device 1 including a visor 40. Additionally, a plurality of mirrors 26 may be included in the HMD device 1. The light path 22 may include a plurality of portions that traverse a corresponding plurality of portions of the visible light waveguide 14. The plurality of mirrors 26 may include a first hot mirror 30 and a second hot mirror 32 each of which reflects IR light and transmits visible light. The first hot mirror 30 and the second hot mirror 32 may be embedded in the visor 40 and configured to relay the IR light from the light source 20 along the IR light path 22. The first hot mirror 30 may be configured to reflect the IR light traversing at least a first portion of the plurality of portions of the visible light waveguide 14. The second hot mirror 32 may be configured to reflect the IR light from at least the first hot mirror 30 to impinge on the eye 18. In this configuration, the IR light may impinge on the eye 18 on-axis relative to an axis of the visible light emitted from the visible light waveguide 14 as it impinges on the eye 18.

Alternatively, the HMD device 1 described above may include a visor 40 where the mirror 26 is a fold mirror. A plurality of portions of the IR light path 22 may traverse a corresponding plurality of portions of the visible light waveguide 14. The fold mirror may be positioned on a same side of the visible light waveguide 14 as the eye 18 and be configured to reflect the IR light traversing at least a first portion of the plurality of portions of the visible light waveguide 14 along the IR light path 22. The surface of the visor 40 may be configured to reflect the IR light from the fold mirror to relay the IR light from the light source 20 to impinge on the eye 18. In this configuration, the IR light may impinge on the eye 18 off-axis relative to an axis of the visible light emitted from the visible light waveguide 14 as it impinges on the eye 18. In an alternative implementation, at least one surface of at least one component of the eye-tracking system 10 may be configured to reflect the IR light from the mirror 26 to relay the IR light from the light source 20 to impinge on the eye 18.

As detailed herein, an eye-tracking system 10 is provided with many advantages for solving the aforementioned problems in HMD design. Bulk and weight may be reduced by implementing a system 10 that packages visible light for the display with IR light for eye-tracking upstream of the respective light paths. Utilizing some of the existing components and architecture of the display device to produce, direct, and receive IR light for eye-tracking may better the overall design of the device. For example, the partial reuse of light in the light engine as described herein may reduce size, weight, and cost of the device 1. In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
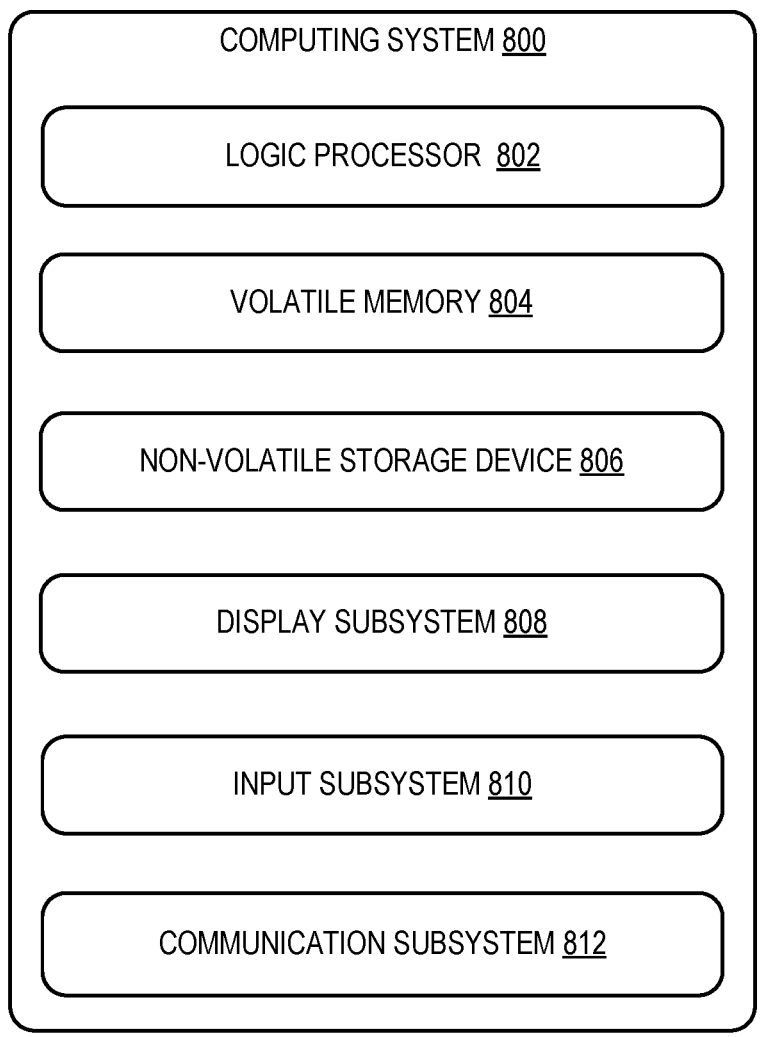
FIG. 11 is an example computing system according to an embodiment of the present description.

FIG. 11 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 11.

Logic processor 802 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. Additionally or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 typically implemented in software by a processor to perform a particular function using portions of volatile memory, which function involves transformative processing that specially configures the processor to perform the function. Thus, a program may be instantiated via logic processor 802 executing instructions held by non-volatile storage device 806, using portions of volatile memory 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 808 may be used to present a visual representation of data held by non-volatile storage device 806. This visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology; however, one utilizing a MEMS scanning mirror to direct laser light may be compatible with the eye-tracking system in a compact manner. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The following paragraphs provide additional support for the claims of the subject application. One aspect provides an eye-tracking system, comprising an at least partially transparent visible light waveguide having a visible light display region configured to emit visible light to impinge upon an eye of a user. A light source is configured to emit at least infrared (IR) light that travels along an IR light path to impinge upon the eye of the user. A microelectromechanical system (MEMS) scanning mirror positioned in the IR light path is configured to direct the IR light along the IR light path. A relay positioned in the IR light path downstream of the MEMS scanning mirror includes at least one mirror configured to reflect the IR light directed by the MEMS scanning mirror along the IR light path. At least one sensor is configured to receive the IR light after being reflected by the eye.

In this aspect, additionally or alternatively, the light source may be positioned on an opposite side of the display region from the eye of the user, and a portion of the IR light path may traverse a portion of the visible light waveguide. In this aspect, additionally or alternatively, the light source may be positioned on a same side of the display region as the eye of the user, and the IR light path may not traverse the visible light waveguide. In this aspect, additionally or alternatively, the at least one mirror may be a hot mirror that reflects IR light and transmits visible light; the hot mirror may be positioned on a same side of the visible light waveguide as the light source and may be configured to reflect the IR light directed by the MEMS scanning mirror and relay the IR light from the light source to impinge on the eye on-axis relative to an axis of the visible light emitted from the visible light waveguide as it impinges on the eye.

In this aspect, additionally or alternatively, the at least one mirror may be a fold mirror; the fold mirror may be positioned on a same side of the visible light waveguide as the eye and may be configured to reflect the IR light and relay the IR light from the light source to impinge on the eye off-axis relative to an axis of the visible light emitted from the visible light waveguide as it impinges on the eye. In this aspect, additionally or alternatively, the at least one mirror may be one of a plurality of mirrors, and the plurality of mirrors may include a first hot mirror and a second hot mirror each of which reflects IR light and transmits visible light. The first hot mirror and the second hot mirror may be positioned on a same side of the visible light waveguide and may be configured to relay the IR light from the light source along the IR light path. The first hot mirror may be configured to reflect the IR light and the second hot mirror may be configured to reflect the IR light from the first hot mirror to impinge on the eye on-axis relative to an axis of the visible light emitted from the visible light waveguide as it impinges on the eye.

In this aspect, additionally or alternatively, the at least one mirror may be one of a plurality of mirrors, and the plurality of mirrors may include a first fold mirror and a second fold mirror. The first fold mirror and the second fold mirror may be positioned on a same side of the visible light waveguide as the eye and may be configured to relay the IR light from the light source along the IR light path. The first fold mirror may be configured to reflect the IR light and the second fold mirror may be configured to reflect the IR light from the first fold mirror to impinge on the eye off-axis relative to an axis of the visible light emitted from the visible light waveguide as it impinges on the eye.

In this aspect, additionally or alternatively, an IR waveguide may be positioned between the eye and the visible light waveguide. The at least one mirror may be one of a plurality of mirrors, and the plurality of mirrors may include a first hot mirror and a second hot mirror each of which reflects IR light and transmits visible light. The first hot mirror and the second hot mirror may be embedded in the IR waveguide and may be configured to relay the IR light from the light source along the IR light path. The first hot mirror may be configured to reflect the IR light and the second hot mirror may be configured to reflect the IR light from the first hot mirror to impinge on the eye on-axis relative to an axis of the visible light emitted from the visible light waveguide as it impinges on the eye.

In this aspect, additionally or alternatively, the visible light waveguide, light source, MEMS scanning mirror, relay, and at least one sensor may be mounted in a head-mounted display (HMD) device including a visor. The at least one mirror may be one of a plurality of mirrors and a plurality of portions of the IR light path may traverse a corresponding plurality of portions of the visible light waveguide. The plurality of mirrors may include a first hot mirror and a second hot mirror each of which reflects IR light and transmits visible light. The first hot mirror and the second hot mirror may be embedded in the visor and may be configured to relay the IR light from the light source along the IR light path. The first hot mirror may be configured to reflect the IR light traversing at least a first portion of the plurality of portions of the visible light waveguide and the second hot mirror may be configured to reflect the IR light from at least the first hot mirror to impinge on the eye on-axis relative to an axis of the visible light emitted from the visible light waveguide as it impinges on the eye.

In this aspect, additionally or alternatively, the visible light waveguide, light source, MEMS scanning mirror, relay, and at least one sensor may be mounted in a head-mounted display (HMD) device including a visor. A plurality of portions of the IR light path may traverse a corresponding plurality of portions of the visible light waveguide. The at least one mirror may be a fold mirror; the fold mirror may be positioned on a same side of the visible light waveguide as the eye and may be configured to reflect the IR light traversing at least a first portion of the plurality of portions of the visible light waveguide along the IR light path. A visor surface may be configured to reflect the IR light from the fold mirror to relay the IR light from the light source to impinge on the eye off-axis relative to an axis of the visible light emitted from the visible light waveguide as it impinges on the eye.

In this aspect, additionally or alternatively, the visible light waveguide, light source, MEMS scanning mirror, relay, and at least one sensor may be mounted in a head-mounted display (HMD) device including a visor. A plurality of portions of the IR light path may traverse a corresponding plurality of portions of the visible light waveguide. The at least one mirror may be a fold mirror; the fold mirror may be positioned on a same side of the visible light waveguide as the eye and may be configured to reflect the IR light traversing at least a first portion of the plurality of portions of the visible light waveguide along the IR light path. At least one surface of at least one component of the eye-tracking system may be configured to reflect the IR light from the fold mirror to relay the IR light from the light source to impinge on the eye off-axis relative to an axis of the visible light emitted from the visible light waveguide as it impinges on the eye.

Another aspect provides a method of illuminating an eye with an eye-tracking system, the method comprising configuring an at least partially transparent visible light waveguide having a visible light display region to emit visible light to impinge upon an eye of a user. The method further comprises emitting at least infrared (IR) light from a light source, the IR light traveling along an IR light path to impinge upon the eye of the user. The method further comprises directing the IR light along the IR light path with a microelectromechanical system (MEMS) scanning mirror positioned in the IR light path and configured to direct the IR light from the light source. The method further comprises redirecting the IR light with a relay positioned in the IR light path downstream of the MEMS scanning mirror, including at least one mirror configured to reflect the IR light directed by the MEMS scanning mirror along the IR light path to impinge upon the eye of the user. The method further comprises receiving a portion of the IR light reflected from the eye of the user via at least one sensor configured to receive IR light.

In this aspect, additionally or alternatively, the light source may be positioned on an opposite side of the display region from the eye of the user, and a portion of the IR light path may traverse a portion of the visible light waveguide. In this aspect, additionally or alternatively, the light source may be positioned on a same side of the display region as the eye of the user, and the IR light path may not traverse the visible light waveguide.

In this aspect, additionally or alternatively, the at least one mirror may be a hot mirror that reflects IR light and transmits visible light. The hot mirror may be positioned on a same side of the visible light waveguide as the light source and may be configured to reflect the IR light directed by the MEMS scanning mirror and relay the IR light from the light source to impinge on the eye on-axis relative to an axis of the visible light emitted from the visible light waveguide as it impinges on the eye.

In this aspect, additionally or alternatively, the at least one mirror may be a fold mirror; the fold mirror may be positioned on a same side of the visible light waveguide as the eye and may be configured to reflect the IR light and relay the IR light from the light source to impinge on the eye off-axis relative to an axis of the visible light emitted from the visible light waveguide as it impinges on the eye.

In this aspect, additionally or alternatively, the at least one mirror may be one of a plurality of mirrors. The plurality of mirrors may include a first hot mirror and a second hot mirror each of which reflects IR light and transmits visible light. The first hot mirror and the second hot mirror may be positioned on a same side of the visible light waveguide and may be configured to relay the IR light from the light source along the IR light path. The first hot mirror may be configured to reflect the IR light and the second hot mirror may be configured to reflect the IR light from the first hot mirror to impinge on the eye on-axis relative to an axis of the visible light emitted from the visible light waveguide as it impinges on the eye.

In this aspect, additionally or alternatively, the at least one mirror may be one of a plurality of mirrors. The plurality of mirrors may include a first fold mirror and a second fold mirror. The first fold mirror and the second fold mirror may be positioned on a same side of the visible light waveguide as the eye and may be configured to relay the IR light from the light source along the IR light path. The first fold mirror may be configured to reflect the IR light and the second fold mirror may be configured to reflect the IR light from the first fold mirror to impinge on the eye off-axis relative to an axis of the visible light emitted from the visible light waveguide as it impinges on the eye.

In this aspect, additionally or alternatively, the method may include positioning an IR waveguide between the eye and the visible light waveguide. The at least one mirror may be one of a plurality of mirrors. The plurality of mirrors may include a first hot mirror and a second hot mirror each of which reflects IR light and transmits visible light. The first hot mirror and the second hot mirror may be embedded in the IR waveguide and may be configured to relay the IR light from the light source along the IR light path. The first hot mirror may be configured to reflect the IR light and the second hot mirror may be configured to reflect the IR light from the first hot mirror to impinge on the eye on-axis relative to an axis of the visible light emitted from the visible light waveguide as it impinges on the eye.

Another aspect provides a head-mounted display (HMD) device with an eye-tracking system, the HMD device comprising an at least partially transparent visible light waveguide having a visible light display region configured to emit visible light to impinge upon an eye of a user. A light source is positioned on an opposite side of the display region from the eye of the user, the light source being configured to emit at least infrared (IR) light that travels along an IR light path to impinge upon the eye of the user, a portion of the IR light path traversing a portion of the visible light waveguide. A microelectromechanical system (MEMS) scanning mirror is positioned in the IR light path and configured to direct the IR light along the IR light path. A relay is positioned in the IR light path downstream of the MEMS scanning mirror and includes at least one mirror configured to reflect the IR light directed by the MEMS scanning mirror along the IR light path. At least one sensor is configured to receive at least a portion of the IR light after being reflected by the eye.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An eye-tracking system, comprising:
    an at least partially transparent visible light waveguide having a visible light display region configured to emit visible light to impinge upon an eye of a user;
    a light source being configured to emit at least infrared (IR) light that travels along an IR light path to impinge upon the eye of the user;
    a microelectromechanical system (MEMS) scanning mirror positioned in the IR light path and configured to direct the IR light along the IR light path;
    a relay positioned in the IR light path external to the visible light waveguide downstream of the MEMS scanning mirror and including at least one mirror configured to reflect the IR light directed by the MEMS scanning mirror along the IR light path toward the eye; and
    at least one sensor configured to receive the IR light after being reflected by the eye.

2. The eye-tracking system of claim 1, wherein the light source is positioned on an opposite side of the display region from the eye of the user, and a portion of the IR light path traverses a portion of the visible light waveguide.

3. The eye-tracking system of claim 1, wherein the light source is positioned on a same side of the display region as the eye of the user, and the IR light path does not traverse the visible light waveguide.

4. The eye-tracking system of claim 1, wherein the at least one mirror is a hot mirror that reflects IR light and transmits visible light, the hot mirror positioned on a same side of the visible light waveguide as the light source and configured to reflect the IR light directed by the MEMS scanning mirror and relay the IR light from the light source to impinge on the eye on-axis relative to an axis of the visible light emitted from the visible light waveguide as it impinges on the eye.

5. The eye-tracking system of claim 1, wherein the at least one mirror is a fold mirror, the fold mirror positioned on a same side of the visible light waveguide as the eye and configured to reflect the IR light and relay the IR light from the light source to impinge on the eye off-axis relative to an axis of the visible light emitted from the visible light waveguide as it impinges on the eye.

6. The eye-tracking system of claim 1, wherein the at least one mirror is one of a plurality of mirrors, and wherein the plurality of mirrors includes a first hot mirror and a second hot mirror each of which reflects IR light and transmits visible light, the first hot mirror and the second hot mirror positioned on a same side of the visible light waveguide and configured to relay the IR light from the light source along the IR light path, the first hot mirror configured to reflect the IR light and the second hot mirror configured to reflect the IR light from the first hot mirror to impinge on the eye on-axis relative to an axis of the visible light emitted from the visible light waveguide as it impinges on the eye.

7. The eye-tracking system of claim 1, wherein the at least one mirror is one of a plurality of mirrors, and wherein the plurality of mirrors includes a first fold mirror and a second fold mirror, the first fold mirror and the second fold mirror positioned on a same side of the visible light waveguide as the eye and configured to relay the IR light from the light source along the IR light path, the first fold mirror configured to reflect the IR light and the second fold mirror configured to reflect the IR light from the first fold mirror to impinge on the eye off-axis relative to an axis of the visible light emitted from the visible light waveguide as it impinges on the eye.

8. The eye-tracking system of claim 1, further comprising:
an IR waveguide, positioned between the eye and the visible light waveguide, wherein
the at least one mirror is one of a plurality of mirrors, and wherein the plurality of mirrors includes a first hot mirror and a second hot mirror each of which reflects IR light and transmits visible light, the first hot mirror and the second hot mirror embedded in the IR waveguide and configured to relay the IR light from the light source along the IR light path, the first hot mirror configured to reflect the IR light and the second hot mirror configured to reflect the IR light from the first hot mirror to impinge on the eye on-axis relative to an axis of the visible light emitted from the visible light waveguide as it impinges on the eye.

9. The eye-tracking system of claim 1, wherein
the visible light waveguide, light source, MEMS scanning mirror, relay, and at least one sensor are mounted in a head-mounted display (HMD) device including a visor;
the at least one mirror is one of a plurality of mirrors;
a plurality of portions of the IR light path traverse a corresponding plurality of portions of the visible light waveguide; and
the plurality of mirrors includes a first hot mirror and a second hot mirror each of which reflects IR light and transmits visible light, the first hot mirror and the second hot mirror embedded in the visor and configured to relay the IR light from the light source along the IR light path, the first hot mirror configured to reflect the IR light traversing at least a first portion of the plurality of portions of the visible light waveguide and the second hot mirror configured to reflect the IR light from at least the first hot mirror to impinge on the eye on-axis relative to an axis of the visible light emitted from the visible light waveguide as it impinges on the eye.

10. The eye-tracking system of claim 1, wherein
the visible light waveguide, light source, MEMS scanning mirror, relay, and at least one sensor are mounted in a head-mounted display (HMD) device including a visor;
a plurality of portions of the IR light path traverse a corresponding plurality of portions of the visible light waveguide;
the at least one mirror is a fold mirror, the fold mirror positioned on a same side of the visible light waveguide as the eye and configured to reflect the IR light traversing at least a first portion of the plurality of portions of the visible light waveguide along the IR light path; and
a visor surface is configured to reflect the IR light from the fold mirror to relay the IR light from the light source to impinge on the eye off-axis relative to an axis of the visible light emitted from the visible light waveguide as it impinges on the eye.

11. The eye-tracking system of claim 1, wherein
the visible light waveguide, light source, MEMS scanning mirror, relay, and at least one sensor are mounted in a head-mounted display (HMD) device including a visor;

a plurality of portions of the IR light path traverse a corresponding plurality of portions of the visible light waveguide;
the at least one mirror is a fold mirror, the fold mirror positioned on a same side of the visible light waveguide as the eye and configured to reflect the IR light traversing at least a first portion of the plurality of portions of the visible light waveguide along the IR light path; and
at least one surface of at least one component of the eye-tracking system is configured to reflect the IR light from the fold mirror to relay the IR light from the light source to impinge on the eye off-axis relative to an axis of the visible light emitted from the visible light waveguide as it impinges on the eye.

12. A method of illuminating an eye with an eye-tracking system, the method comprising:
configuring an at least partially transparent visible light waveguide having a visible light display region to emit visible light to impinge upon an eye of a user;
emitting at least infrared (IR) light from a light source, the IR light traveling along an IR light path to impinge upon the eye of the user;
directing the IR light along the IR light path with a microelectromechanical system (MEMS) scanning mirror positioned in the IR light path and configured to direct the IR light from the light source;
redirecting the IR light with a relay positioned in the IR light path external to the visible light waveguide downstream of the MEMS scanning mirror and including at least one mirror configured to reflect the IR light directed by the MEMS scanning mirror along the IR light path to impinge upon the eye of the user; and
receiving a portion of the IR light reflected from the eye of the user via at least one sensor configured to receive IR light.

13. The method of claim 12, wherein the light source is positioned on an opposite side of the display region from the eye of the user, and a portion of the IR light path traverses a portion of the visible light waveguide.

14. The method of claim 12, wherein the light source is positioned on a same side of the display region as the eye of the user, and the IR light path does not traverse the visible light waveguide.

15. The method of claim 12, wherein the at least one mirror is a hot mirror that reflects IR light and transmits visible light, the hot mirror positioned on a same side of the visible light waveguide as the light source and configured to reflect the IR light directed by the MEMS scanning mirror and relay the IR light from the light source to impinge on the eye on-axis relative to an axis of the visible light emitted from the visible light waveguide as it impinges on the eye.

16. The method of claim 12, wherein the at least one mirror is a fold mirror, the fold mirror positioned on a same side of the visible light waveguide as the eye and configured to reflect the IR light and relay the IR light from the light source to impinge on the eye off-axis relative to an axis of the visible light emitted from the visible light waveguide as it impinges on the eye.

17. The method of claim 12, wherein the at least one mirror is one of a plurality of mirrors, and wherein the plurality of mirrors includes a first hot mirror and a second hot mirror each of which reflects IR light and transmits visible light, the first hot mirror and the second hot mirror positioned on a same side of the visible light waveguide and configured to relay the IR light from the light source along the IR light path, the first hot mirror configured to reflect the IR light and the second hot mirror configured to reflect the IR light from the first hot mirror to impinge on the eye on-axis relative to an axis of the visible light emitted from the visible light waveguide as it impinges on the eye.

18. The method of claim 12, wherein the at least one mirror is one of a plurality of mirrors, and wherein the plurality of mirrors includes a first fold mirror and a second fold mirror, the first fold mirror and the second fold mirror positioned on a same side of the visible light waveguide as the eye and configured to relay the IR light from the light source along the IR light path, the first fold mirror configured to reflect the IR light and the second fold mirror configured to reflect the IR light from the first fold mirror to impinge on the eye off-axis relative to an axis of the visible light emitted from the visible light waveguide as it impinges on the eye.

19. The method of claim 12, further comprising:
positioning an IR waveguide between the eye and the visible light waveguide, wherein
the at least one mirror is one of a plurality of mirrors, and wherein the plurality of mirrors includes a first hot mirror and a second hot mirror each of which reflects IR light and transmits visible light, the first hot mirror and the second hot mirror embedded in the IR waveguide and configured to relay the IR light from the light source along the IR light path, the first hot mirror configured to reflect the IR light and the second hot mirror configured to reflect the IR light from the first hot mirror to impinge on the eye on-axis relative to an axis of the visible light emitted from the visible light waveguide as it impinges on the eye.

20. A head-mounted display (HMD) device with an eye-tracking system, the HMD device comprising:
an at least partially transparent visible light waveguide having a visible light display region configured to emit visible light to impinge upon an eye of a user;
a light source positioned on an opposite side of the display region from the eye of the user, the light source being configured to emit at least infrared (IR) light that travels along an IR light path to impinge upon the eye of the user, a portion of the IR light path traversing a portion of the visible light waveguide;
a microelectromechanical system (MEMS) scanning mirror positioned in the IR light path and configured to direct the IR light along the IR light path;
a relay positioned in the IR light path external to the visible light waveguide downstream of the MEMS scanning mirror and including at least one mirror configured to reflect the IR light directed by the MEMS scanning mirror along the IR light path toward the eye; and
at least one sensor configured to receive at least a portion of the IR light after being reflected by the eye.

* * * * *